UNITED STATES PATENT OFFICE.

SAMUEL PAGE, OF CHELSEA, MASSACHUSETTS.

IMPROVED VARNISH.

Specification forming part of Letters Patent No. 25,757, dated October 11, 1859.

*To all whom it may concern:*

Be it known that I, SAMUEL PAGE, of Chelsea, in the county of Suffolk and State of Massachusetts, have invented an Improved Varnish, which I call "Paraffine Varnish," of which the following is a full, clear, and exact description.

The object of my present invention is to produce a cheap "black varnish," which will dry readily; and my invention consists in mixing together a distillate of coal-tar, produced by distillation at a certain temperature, and the residuum left from a further distillation at a higher temperature.

That others skilled in the art may understand and use my invention, I will proceed to describe the manner in which I have carried it out.

I place a charge of "coal-tar" in an ordinary iron still and distill it at a temperature of 185° to 200° Fahrenheit. The product of distillation is a "spirit" or "coal-naphtha," which I set aside for further use. The temperature is then raised to 300° or 400°, and continued until all the products of distillation obtainable at this temperature have passed off, when the "residuum" is removed. This residuum is a solid substance, which melts at a high temperature. I now mix the coal-naphtha and residuum together in equal proportions, by measure, and boil them in an iron kettle. This produces at a low cost a brilliant black varnish, which dries readily, and is applicable to all the uses to which the more expensive "asphaltum varnish" is generally put.

What I claim as my invention, and desire to secure by Letters Patent, is—

The above-described varnish, made of the materials specified.

SAMUEL PAGE.

Witnesses:
  THOS. R. ROACH,
  THOS. L. GLOVER.